(12) United States Patent
Basile et al.

(10) Patent No.: US 8,367,165 B2
(45) Date of Patent: Feb. 5, 2013

(54) METHOD OF APPLYING A WATER-BASE ADHESIVE MIX FOR PRODUCING TYRES

(75) Inventors: Alessandro Basile, Pomezia (IT); Stefano Cotroni, Rome (IT)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/738,389

(22) PCT Filed: Oct. 17, 2008

(86) PCT No.: PCT/EP2008/064080
§ 371 (c)(1),
(2), (4) Date: Jul. 19, 2010

(87) PCT Pub. No.: WO2009/050293
PCT Pub. Date: Apr. 23, 2009

(65) Prior Publication Data
US 2010/0282382 A1    Nov. 11, 2010

(30) Foreign Application Priority Data
Oct. 17, 2007  (IT) .............................. TO2007A0733

(51) Int. Cl.
*B05D 3/06* (2006.01)
*B29D 30/54* (2006.01)
(52) U.S. Cl. ......................................... 427/557; 156/96
(58) Field of Classification Search .................. 427/557, 427/98.3; 152/209.1, 151, 209.6; 156/94, 156/95, 96, 110.1, 114, 127, 123, 128.1, 156/130, 128.6, 130.5
See application file for complete search history.

(56) References Cited

U.S. PATENT DOCUMENTS

| 4,031,271 A | 6/1977 | Bush |
| 4,232,979 A | 11/1980 | Johnson, Jr. et al. |
| 2006/0005912 A1 * | 1/2006 | Weydert et al. ............ 156/110.1 |
| 2006/0045983 A1 * | 3/2006 | Gorman et al. ............... 427/438 |
| 2009/0022904 A1 * | 1/2009 | Yotsumoto et al. ........... 427/557 |

FOREIGN PATENT DOCUMENTS

| DE | 43 45 127 A1 | 7/1995 |
| EP | 0 043 410 A2 | 1/1982 |
| JP | 08-013346 A | 1/1996 |
| NL | 7703648 A | 10/1978 |
| WO | WO 2006117964 A1 * | 11/2006 |

OTHER PUBLICATIONS

Database WPI Week 199612, Thomson Scientific, London, GB, AN 1996-113285, XP002510825 & JP 08 013346 A (Teijin Ltd), Jan. 16, 1996.
Database WPI Week 197842, Thomson Scientific, London, GB, AN 1977-46877Y, XP002510826 & NL 7703648 A (Grace & W R), Oct. 6, 1978.

* cited by examiner

*Primary Examiner* — Dah-Wei Yuan
*Assistant Examiner* — Nga Leung V Law
(74) *Attorney, Agent, or Firm* — Sughrue Mion, PLLC

(57) ABSTRACT

A method of applying a water-base adhesive mix for producing tires, the method including a step of applying a layer of adhesive mix to a work surface; and a step of drying the layer, and which includes microwave heating.

4 Claims, No Drawings

METHOD OF APPLYING A WATER-BASE ADHESIVE MIX FOR PRODUCING TYRES

CROSS REFERENCE TO RELATED APPLICATION

This application is a National Stage of International Application No. PCT/EP2008/064080 filed Oct. 17, 2008, claiming priority based on Italian Patent Application No. TO2007A000733, filed Oct. 17, 2007, the contents of all of which are incorporated herein by reference in their entirety.

TECHNICAL FIELD

The present invention relates to a method of applying a water-base adhesive mix for producing tyres.

BACKGROUND ART

In tyre manufacturing, adhesive mixes, commonly known as cements, are normally organic-solvent-based. Adhesive mixes of this sort are highly adhesive and easy to use, mainly on account of rubber dissolving readily in organic solvents and so blending with other rubber to form practically one piece once the organic solvent evaporates.

This type of adhesive mix has the major drawback of containing a large amount of organic solvent, which, as is known, is highly volatile and, because of its characteristics, may pose environmental problems.

For all these reasons, recent European directives have imposed a drastic reduction in the use of organic solvents in tyre manufacturing, thus forcing manufacturers to devise alternative solutions to ensure correct adhesion of rubber layers.

One alternative to conventional adhesive mixes is water-base adhesive mixes. If dried using conventional, i.e. hot-air-circulation, methods, however, applying water-base adhesive mixes has the drawback of taking too long, and of forming a microfilm of water beneath a "dry" surface layer.

One possible solution to the problem is to divide application of the adhesive mix into two consecutive applications, to achieve a very thin layer of adhesive mix at each of the two drying steps. Though dividing application of the adhesive mix into two solves the microfilm formation problem, overall drying time is still longer than for organic-solvent-base adhesive mixes, thus reducing output rate with respect to the latter.

DISCLOSURE OF INVENTION

It is an object of the present invention to provide a method of applying a water-base adhesive mix, the characteristics of which guarantee fast drying, at least comparable with that of organic-solvent-base adhesive mixes.

According to the present invention, there is provided a method of applying a water-base adhesive mix for producing tyres, comprising a step of applying a layer of adhesive mix to a work surface, and a step of drying said layer; said method being characterized in that said drying step comprises microwave heating.

In a preferred embodiment of the method according to the present invention, the drying step comprises recirculating-hot-air heating simultaneously with and after microwave heating.

In a further preferred embodiment of the method according to the present invention, the drying step is performed at a temperature of about 60° C.

In yet a further preferred embodiment of the method according to the present invention, application of the adhesive mix is divided into successive applications, each comprising a coating step and a drying step.

The following examples are purely indicative and non-limiting, for a clearer understanding of the invention.

The examples below relate to laboratory tests in which the drying step of two embodiments of the method according to the present invention was applied to a water-base adhesive mix, and the conventional drying method was applied to a water-base adhesive mix and an organic-solvent-base adhesive mix.

More specifically, the adhesive mixes were applied to a surface of a pre-cured tread, which, as is the custom in cold-retreading, is eventually joined to the carcass+cushion system.

Method A refers to the method of the present invention, in which a 200 μm layer of water-base adhesive mix was microwave heated at a power of 600 W for 25 s, and was subjected, during and after, to recirculating-hot-air treatment at 60° C. until completely dry.

Method B refers to a second embodiment of the method according to the present invention, in which two 100 μm layers of water-base adhesive mix were microwave heated consecutively at a power of 600 W for 12.5 s each, and were subjected, during and after, to recirculating-hot-air treatment at 60° C. until completely dry.

Method C refers to the conventional method, in which a 200 μm layer of water-base adhesive mix was subjected to recirculating-hot-air treatment at 60° C. until completely dry.

Method D refers to the conventional method, in which a 200 μm layer of organic-solvent-base adhesive mix was subjected to recirculating-hot-air treatment at 60° C. until completely dry.

As will be obvious to an expert, the microwave power applied depends on operating conditions, such as the mass to be heated (water film plus rubber) and the size and type of oven used. The only limitation to microwaving is that heating should not impair the mechanical characteristics of the rubber to which the adhesive mix is applied.

Table I shows the parameters of the methods according to the present invention, and of conventional methods.

TABLE I

| Method | A | B | C | D |
| --- | --- | --- | --- | --- |
| Total time (s) | 60 | 40 | 400 | 60 |
| Microfilm formation | no | no | yes | no |

As shown in Table I, the method according to the present invention provides for the same drying time as for organic-solvent-base adhesive mixes, while at the same time preventing formation of the inner microfilm referred to in connection with the drawbacks of the known art. Moreover, dividing application of the adhesive mix into two consecutive applications (Method B) provides for even faster overall drying time than for organic-solvent-base adhesive mixes.

The conventional method applied to water-base adhesive mixes (Method C), on the other hand, gives a much higher drying time than for organic-solvent-base adhesive mixes, and also results in the formation of an inner microfilm.

The invention claimed is:

1. A method of applying a water-base adhesive mix for producing tyres, comprising a sequence of a deposition step wherein a layer of an adhesive mix is deposited to a surface of a rubber layer and a drying step wherein said deposited layer of water-base adhesive mix is dried at a temperature of 50 to 70° C. by means of microwave heating; wherein said sequence of deposition step and drying step is repeated at least two times.

2. A method of applying a water-base adhesive mix, as claimed in claim 1, wherein the drying step comprises recirculating-hot-air heating simultaneously with and/or after microwave heating.

3. A method of applying a water-base adhesive mix, as claimed in claim 1, wherein said sequence of deposition step and drying step is repeated two times.

4. A method of applying a water-base adhesive mix, as claimed in claim 1, wherein said drying step comprises microwave heating and is performed at a temperature of 50 to 60° C.

* * * * *